United States Patent [19]

Krausener et al.

[11] Patent Number: 5,105,874
[45] Date of Patent: Apr. 21, 1992

[54] PROCESS FOR CONTINUOUSLY DETERMINING THE THICKNESS OF THE LIQUID SLAG ON THE SURFACE OF A BATH OF MOLTEN METAL IN A METALLURGICAL CONTAINER

[75] Inventors: Gilbert Krausener, Metz; Jean-François Martin, Nancy, both of France

[73] Assignee: Institut de Recherches de la Siderurgie Francaise (IRSID), Puteaux, France

[21] Appl. No.: 581,271

[22] Filed: Sep. 12, 1990

[30] Foreign Application Priority Data

Sep. 13, 1989 [FR] France .................. 89 11994

[51] Int. Cl.$^5$ .............................................. B22D 11/16
[52] U.S. Cl. .................................... 164/451; 164/4.1; 164/150; 266/94; 73/290 R
[58] Field of Search ............... 164/4.1, 150, 451; 266/92, 94; 75/375; 73/290 R, 292, 295, 304 C; 374/139, 140

[56] References Cited

U.S. PATENT DOCUMENTS 4,470,446  9/1984  Kamikawa .................. 164/451

FOREIGN PATENT DOCUMENTS

| 14451 | 1/1982 | Japan | 164/150 |
| 56146 | 4/1982 | Japan | 164/150 |
| 166065 | 7/1987 | Japan | 164/451 |
| 242451 | 10/1988 | Japan | 164/451 |
| 2772 | 1/1989 | Japan | 164/451 |
| 8602203 | 4/1988 | Netherlands | 164/4.1 |

Primary Examiner—Richard K. Seidel
Attorney, Agent, or Firm—Fay, Sharpe, Beall, Fagan, Minnich & McKee

[57] ABSTRACT

According to this process: the position in respect of height of the "molten metal (2)/liquid slag (3)" interface (M) is continuously determined. Further the position of an isotherm (IS) located at the "liquid slag (3)/powder layer (4)" interface is continuously determined by automatically controlling the position of a thermocouple (8) on this isotherm and by measuring the displacements of this thermocouple.

By comparing the position in respect of height of the molten metal/liquid slag interface (M) with the position in respect of height of the isotherm (IS), the thickness and thus the variations in thickness of the liquid slag are continuously deduced.

5 Claims, 2 Drawing Sheets

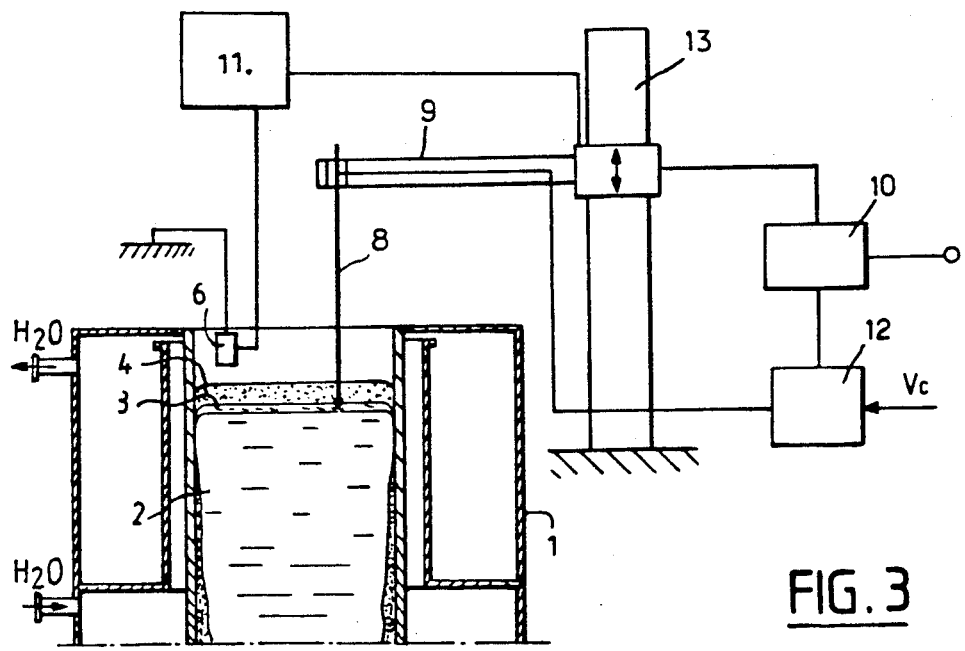
FIG. 3
FIG. 4
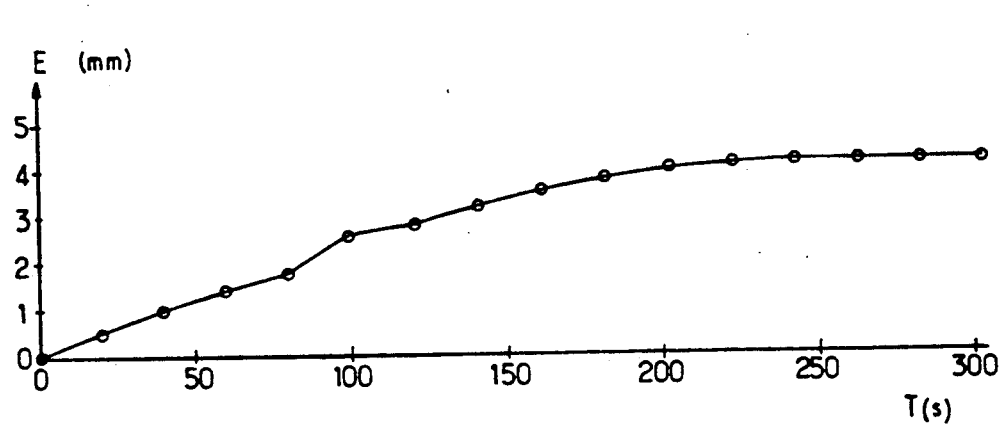

PROCESS FOR CONTINUOUSLY DETERMINING THE THICKNESS OF THE LIQUID SLAG ON THE SURFACE OF A BATH OF MOLTEN METAL IN A METALLURGICAL CONTAINER

The present invention relates to a process for continuously determining the thickness of the liquid slag on the surface of a bath of molten metal in a metallurgical container, such as a continuous-casting ingot mould, in the case of casting with covering powder.

As is known, there is considerable advantage in determining the thickness of the liquid slag: it makes it possible to judge the quality of the lubrication and, above all, to evaluate the risks of the entrainment of inclusions of covering powder in the steel skin. The risk of the entrainment of powder is, in fact, very great when the thickness of the liquid slag on the meniscus falls below 2 or 3 mm.

To this end, a so-called "bifilar" manual method has hitherto been used, which method consists in immersing a copper wire and a steel rod into the steel/slag system. The copper melts in a zone close to the liquid slag/sintered slag interface, whereas the steel melts at the molten steel/liquid slag interface. The thickness of liquid slag is deduced therefrom by measuring the distance between the end of the copper wire and the end of the steel rod.

It is recalled that, during casting, the molten metal is surmounted by a layer of liquid slag originating from the melting of the covering powder, which is continuously fed into the ingot mould during casting. As it heats up, the covering powder gradually forms a sintered powder or "sintered slag" which, when it approaches the molten metal, melts in order to form the layer of liquid slag.

In the case of slabs, the bifilar device is immersed into the centre of a half-ingot mould, between the small face and the nozzle, the requisite number of measurements being from 20 to 25 per ladle in order for the results to be significant. The immersion time is approximately 2 seconds for conventional-grade slabs and may be up to 10 seconds for some grades.

However, these manual spot measurements remain relatively inaccurate and do not give instantaneous values which are reliable and, above all, continuous.

The aim of the invention is thus to propose a process which makes it possible continuously to measure, with precision and automatically, the thickness of the liquid slag at the level of the meniscus.

According to the invention, the procedure is as follows:

a) the position in respect of height of the "molten metal/liquid slag" interface is continuously determined, b) the position of an isotherm located at the "liquid slag/powder layer" interface is continuously determined by automatically controlling the position of a thermocouple on this isotherm and by measuring the displacements of this thermocouple, c) and, by comparing the position in respect of height of the molten metal/liquid slag interface with the position in respect of height of the isotherm, the thickness and thus the variations in thickness of the liquid slag are continuously deduced.

The position in respect of height of the interface between the molten steel and the liquid slag is determined, in a manner known per se, by an eddy-current coil disposed at a distance above the layer of pulverulent powder or by any other equivalent means.

In order to be able to determine the thickness of liquid slag on the basis of the measurement of the height of the molten metal/liquid slag interface and of the measurement of the displacements of the thermocouple, it suffices to calibrate, prior to casting, the various measurement devices relative to a reference level such as, for example, the envisaged level of the molten metal in the ingot mould.

As a variation, the thickness of the liquid slag may be determined during casting. It may be measured, for example, using a bifilar system. The variation in this thickness is then monitored by noting the variation in the position of the isotherm using the thermocouple slaved thereto and variations in height of the molten metal/liquid slag interface.

The device according to the invention for implementing this process comprises a system for automatically controlling the position of a thermocouple on the isotherm located at the "liquid slag/powder layer" interface, means for measuring the displacement of the thermocouple, a means for measuring the variations in the height of the "molten metal/liquid slag" interface relative to a pre-established reference point, and means for continuously calculating the thickness and thus the variations in thickness of the liquid slag on the basis of the variations in the height of the "molten metal/liquid slag" interface and of the displacement of the thermocouple.

Other features and advantages of the invention will become apparent during the following description which is given with reference to the appended drawings which illustrate an embodiment thereof by way of non-limiting example.

FIG. 3 is a simplified view in elevation of an industrial embodiment of the device referred to by the invention.

FIG. 4 is a diagram illustrating a numerical example of variation in the position of the liquid slag/solid slag isotherm as a function of time.

Figure 1:
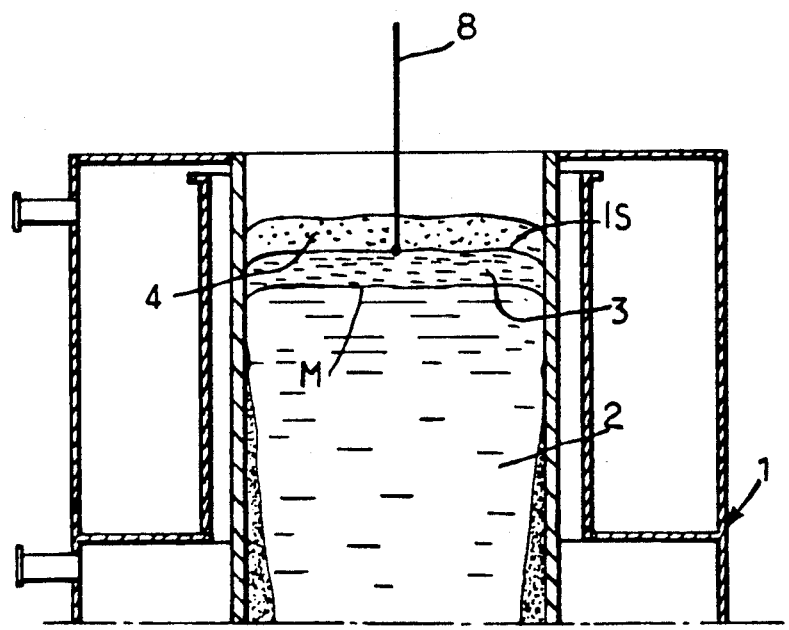
FIG. 1 is a diagrammatic view in section of an ingot mould containing a bath of molten steel covered with slag.

The ingot mould 1 shown in FIG. 1 contains the molten steel 2 surmounted, in succession, by a layer of liquid slag 3 and a powder layer 4, the melting of which creates liquid slag in step with its consumption for the requirements of the casting. Thermally speaking, these layers are separated by isotherms. The isotherm IS, to which the invention refers most particularly, is that, generally close to 1100° C., representing the melting of the powder and which is consequently located at the "liquid slag 3/powder layer 4" interface.

Figure 2:
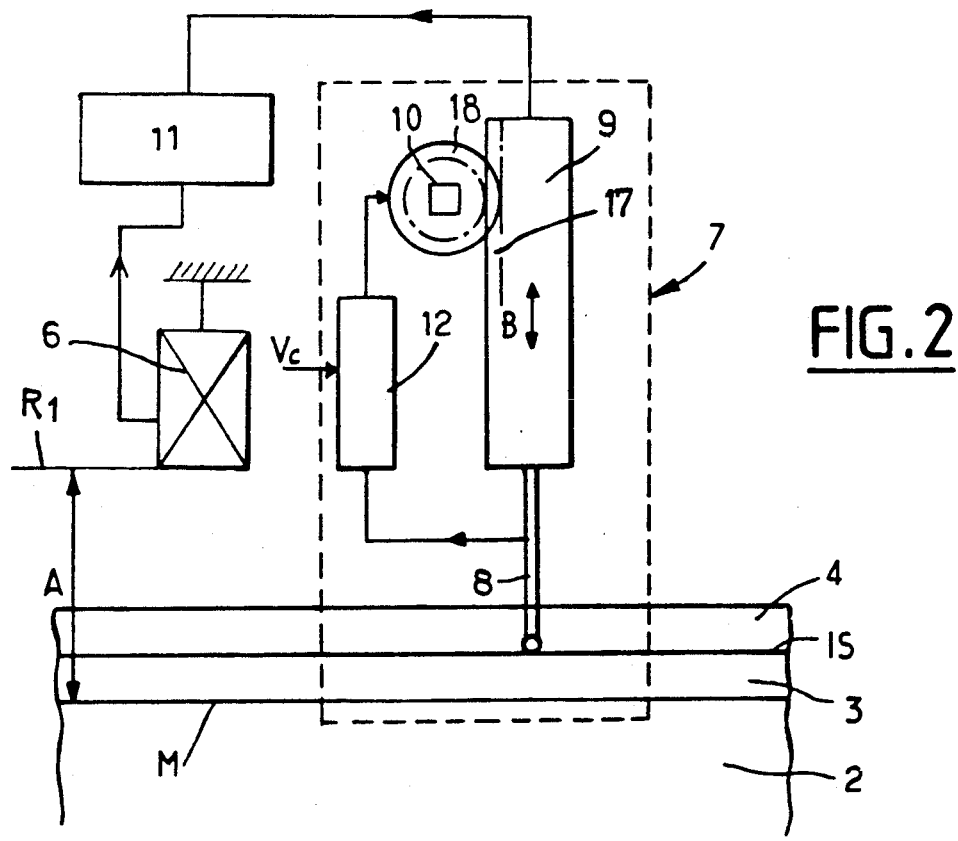
FIG. 2 is a basic diagram of an embodiment of the process according to the invention.

In order continuously to determine the variation in thickness of the layer of liquid slag 3, the device referred to by the invention comprises, on the one hand, an eddy-current coil 6 disposed a short distance above the powder layer 4 in a specific position which can be determined by virtue of the fixed reference R1. This coil acts as a sensor in order to provide a measurement A representing the position in respect of height of the molten metal 2/liquid slag 3 interface M (FIG. 2). Moreover, a system 7 for automatically controlling the position of the head of a thermocouple 8 on the isotherm IS, located at the liquid slag 3/powder layer 4 interface, is also provided. The thermocouple 8 is carried by a support 9 which can be driven in the vertical direction above the ingot mould 1 by a rack 17/pinion 18 couple. The pinion 18 is driven in rotation by a reversible motor 10 connected to a regulator 12 slaved to a reference voltage $V_c$ corresponding to the temperature of the chosen isotherm IS. The automatic control device 7 is also in association with means 11 for measurement, calculation and restoration of results, connected to the sensor 6 and to a sensor of the displacement of the thermocouple support 9, such as an incremental encoder (not shown in FIG. 2) mounted at the end of the rotary shaft of the motor 10.

In the embodiment illustrated in FIG. 3, the support 9 is a horizontal arm, at one end of which is fixed the thermocouple 8 and at the other end of which is mounted in a sliding and adjustable manner on an upright 13 disposed close to the ingot mould 1.

When the temperature measured by the thermocouple 8 is different from the temperature of the isotherm IS (1100° C. in the example described), the corresponding voltage provided to the regulator 12 is different from the reference voltage $V_c$. Therefore, the regulator 12 controls the motor 10 in one direction or the other as a function of the sign of the difference between measured temperature and reference temperature in order to bring the head of the thermocouple 8 exactly onto this isotherm. Thus, when the measured temperature is less than the reference temperature, this means that the level of the isotherm has dropped and, consequently, the regulator 12 controls the motor 10 in the direction which lowers the thermocouple 8. A manoeuvre in the opposite direction results from a measured temperature which is higher than the reference temperature. The means 11 continuously calculate the displacement B of the support 9 and the distance A of the liquid slag 3 on the basis of the measurement.

On the basis of the continuous measurements of A and B, the calculation means 11 then determine the variations in the thickness of the liquid slag 3 and, if the position of the thermocouple has previously been calibrated relative to the fixed reference point R1, continuously deduce therefrom the thickness of the liquid slag.

The implementation of the process according to the invention by means of the device which has just been described follows directly from the description thereof which has just been given and takes place as follows:

a) the thickness of the liquid slag 3 is possibly, but not necessarily, measured at the start by a known means such as a bifilar means, b) the height A is measured, the thermocouple 8 is slaved on the isotherm IS and the thickness and/or the variations in thickness of the liquid slag 3 is/are continuously determined as explained above.

FIG. 4 is a diagram obtained by implementing the process and the device according to the invention, illustrating a numerical example showing the variation in the height of the isotherm IS as a function of time relative to the meniscus of molten metal, that is to say the thickness E of the liquid slag 3 just after the powder has been placed on the bath of molten metal. In this example, it is thus possible to observe that the thickness of liquid slag stabilizes after a period of 200 to 250 seconds, approximately. An accidental variation in this thickness could similarly be obtained.

For example, an abnormal drop of the isotherm IS corresponds to an abnormal reduction in thickness of the liquid slag 3. In order to remedy this, the operator can then reduce the speed of casting the molten metal in order again to increase the thickness of the liquid slag 3, this thickness being directly linked to the quantity of slag consumed and thus to the casting speed.

The signals of the eddy-current coil 6 are very reliable at low frequency (of the order of 100 KHz) in order to determine the level of the meniscus M of the molten metal. However, other means could also be used in order to determine the position of the molten metal/liquid slag interface M, such as an automatic control device similar to that described above but which operates with a thermocouple slaved on an isotherm close to the liquidus of the cast metal.

It should be noted that the process and the device according to the invention make it possible to know, in particular, the maximum and minimum values of the thickness of the liquid slag 3, even if this thickness is disturbed by the oscillation of the ingot mould 1.

We claim:

1. Process for continuously determining a thickness of liquid slag (3) on a surface of a bath of molten metal (2) in a metallurgical container, the liquid slag (3) being formed from a powder layer (4) which surmounts it, the process comprising the steps of:
   a) continuously determining a position of a height of a molten metal (2)/liquid slag (3) interface (M);
   b) continuously determining a position of an isotherm (IS) located at a liquid slag (3)/powder layer (4) interface by automatically controlling the position of a thermocouple (8) on the isotherm and by measuring the displacements of the thermocouple; and,
   c) continuously deducing the thickness of the liquid slag by comparing the height of the molten metal/liquid slag interface (M) with the height of the isotherm (IS).

2. Process according to claim 1, wherein the height of the molten metal (2)/liquid slag (3) interface is determined by an eddy-current coil (6) disposed at a distance above the powder layer (4).

3. An apparatus for continuously, automatically calculating a thickness of liquid slag on a surface of a bath of molten metal, the apparatus comprising:
   a system (7) for automatically controlling a position of a thermocouple (8) on an isotherm (IS) located at a liquid slag (3)/powder layer (4) interface;
   means for measuring a displacement of the thermocouple (8);
   means (6) for measuring variations in a height (A) of a molten metal (2)/liquid slag (3) interface (M) relative to a pre-established reference point ($R_1$); and,
   means for continuously calculating a thickness of the liquid slag on the basis of the variations in the height (A) of the molten metal/liquid slag interface and of the displacement of the thermocouple.

4. The apparatus of claim 3, further comprising:
   an automatic control system (7) which comprises a thermocouple (8) carried by a support (9) whose position above an ingot mould (1) can be adjusted by means of a reversible motor (10) controlled by a regulator (12) slaved to a reference voltage ($V_c$) corresponding to a temperature of the isotherm (IS).

5. A process for continuously determining a thickness of liquid slag (3) on a surface of a bath of molten metal (2) in a continuous-casting ingot mould (1), the liquid slag (3) being formed from a powder layer (4) which surmounts it, the process comprising the steps of:

a) continuously determining a position of a height of a molten metal (2)/liquid slag (3) interface (M);

b) continuously determining a position of an isotherm (IS) located at a liquid slag (3)/powder layer (4) interface by automatically controlling the position of a thermocouple (8) on the isotherm and by measuring the displacements of the thermocouple; and, c) continuously deducing the thickness of the liquid slag by comparing the height of the molten metal/liquid slag interface (M) with the height of the isotherm (IS).

* * * * *